April 29, 1941.  W. R. LUSTIG  2,240,143
ADJUSTABLE SEAT
Filed June 18, 1937  2 Sheets-Sheet 1
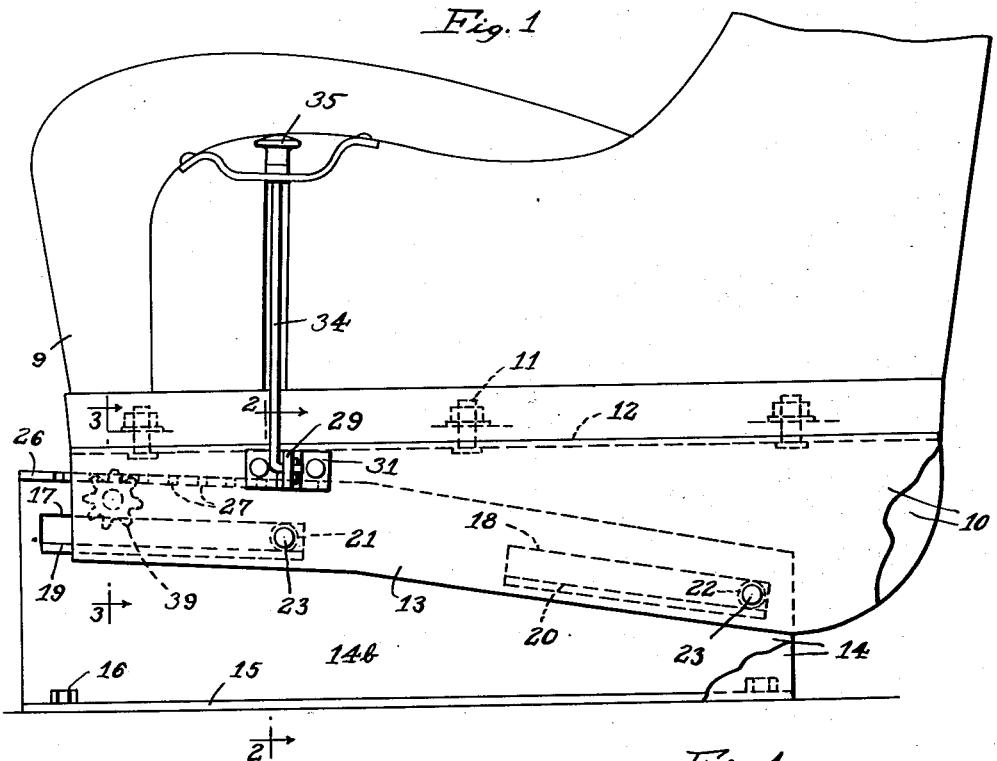
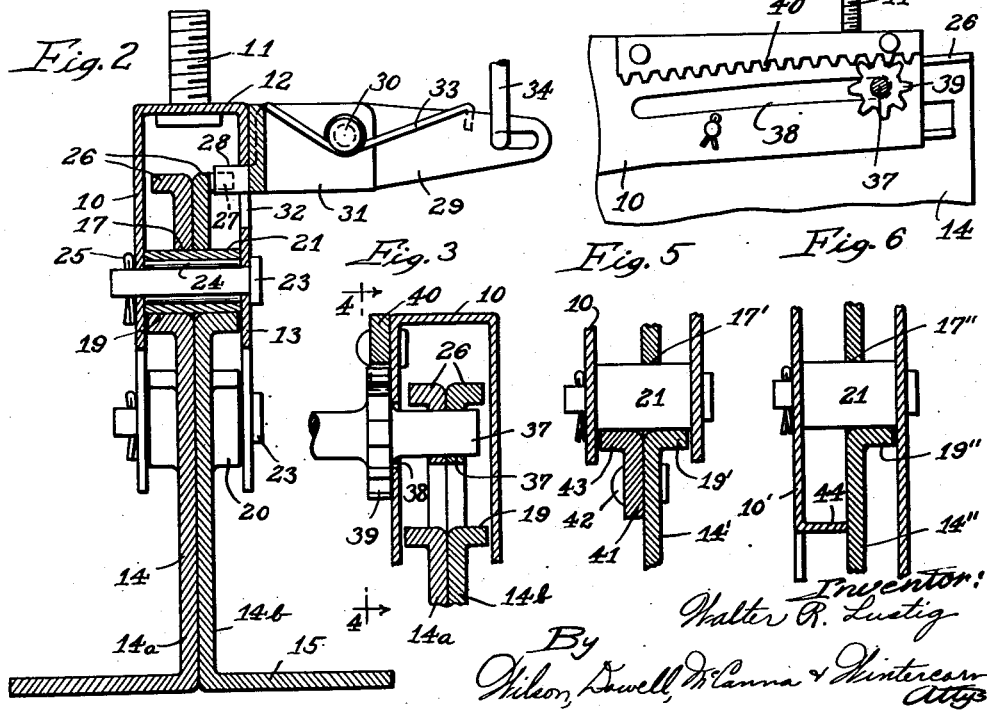

April 29, 1941.   W. R. LUSTIG   2,240,143
ADJUSTABLE SEAT
Filed June 18, 1937   2 Sheets-Sheet 2
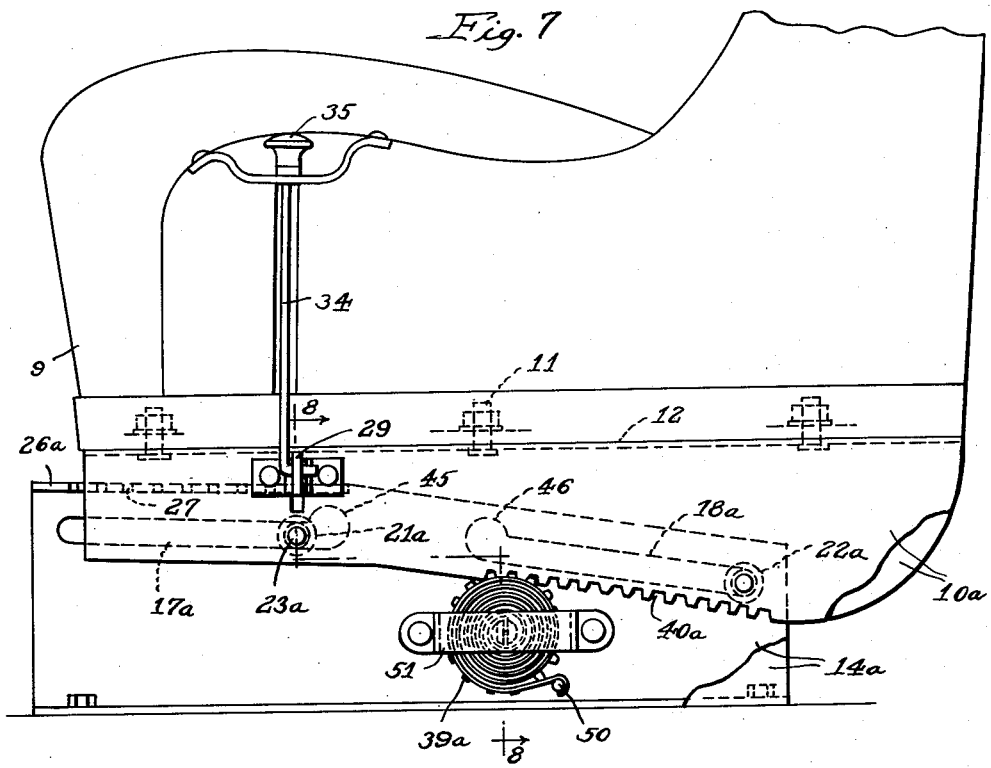
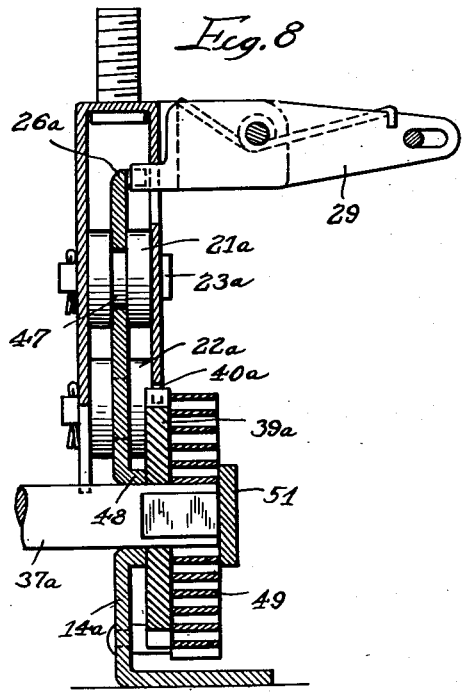
Inventor:
Walter R. Lustig
By Wilson, Dowell,
McCanna & Wintercorn
Attys.

Patented Apr. 29, 1941

2,240,143

UNITED STATES PATENT OFFICE 2,240,143

ADJUSTABLE SEAT

Walter R. Lustig, Rockford, Ill., assignor to The Atwood Vacuum Machine Company, Rockford, Ill., a copartnership composed of Seth B. Atwood and James T. Atwood Application June 18, 1937, Serial No. 148,828

20 Claims. (Cl. 155—14)

This invention relates to adjustable seats especially designed and adapted for use in motor vehicles.

One of the principal objects of the present invention is to provide a seat mounting affording back and forth movement and adjustment accompanied with up and down adjustment of the back of the seat, whereby to provide the same comfort in all positions of adjustment.

Seat mountings for the sake of economy must be made of sheet metal and in many instances such construction, especially under the stress of quantity production, which does not permit of working to the closer limits, has resulted in sticking and binding of the parts intended to slide easily. It is another important object of my invention to provide a seat mounting of sheet metal construction but incorporating various novel features tending to insure smoother and easier operation even though the parts are mostly rough sheet metal stampings. Thus, for example, the invention in both forms embodies rollers on the slides working on tracks formed in slots on the floor brackets and the tracks are designed to give smooth operation while the rollers have needle bearings to insure easy turning, so that the combination insures the desired easy operation and freedom from sticking and binding.

The invention further aims to provide a seat mounting easier to manufacture than most of those previously proposed and which will accordingly be available at a lower cost.

A further aim of the invention is to provide the roller tracks as well as the notched members to cooperate with the locking latches, in the form of flanges bent at right angles to the plane of the floor brackets, whereby to reduce the number of parts and make for increased strength and stiffness.

The invention is illustrated in the accompanying drawings, in which—

Figure 1 is a side view of the lower portion of an adjustable seat showing a mounting made in accordance with the present invention;

Fig. 2 is a vertical cross-section on a larger scale on the line 2—2 of Figure 1;

Fig. 3 is a sectional detail on the same scale as Fig. 2 taken on the line 3—3 of Figure 1;

Fig. 4 is a view in the plane of line 4—4 of Fig. 3, but on the same scale as Figure 1;

Fig. 5 is a sectional detail of one of the rollers and tracks but showing another construction;

Fig. 6 is a similar sectional detail showing still another construction;

Fig. 7 is a view similar to Figure 1 showing another seat mounting, and

Fig. 8 is a vertical section on the broken line 8—8 of Fig. 7 on a larger scale.

Similar reference numerals are applied to corresponding parts throughout the views.

Referring first to Figs. 1-5, the seat 9 is a single passenger front seat for an automobile arranged to be adjusted or moved back and forth, and, simultaneously with forward adjustment, to have the back of the seat elevated more and more by virtue of the special construction of the seat mounting. The increased elevation of the back of the seat with forward adjustment has been found to give the same degree of riding comfort in all positions of adjustment, whereas, a seat adjustable to and fro in one plane might be comfortable for a person of one stature but decidedly uncomfortable for another person when adjusted to some other position to suit the requirements of that person of different stature. Now, while the seat 9 has been designated as a single seat, it should be understood that the mounting therefor hereinafter described would also be suitable for a double seat.

Two sheet metal slides 10 of inverted channel cross-section are secured to the bottom of the seat at opposite sides in parallel relation in any suitable or preferred manner, bolts 11 being shown extending upwardly from the web 12 of the slide 10 in Fig. 2. The parallel side walls 13 of each slide are of the form clearly appearing in Fig. 1, being wider at the back and diminishing in width toward the front. The two slides 10 fit over and work back and forth on a pair of sheet metal floor brackets 14, the general form of which clearly appears in Fig. 1, the same being highest at the front end and sloping downwardly toward the rear end. Each floor bracket is made in two pieces 14a and 14b bent to angular form to provide bottom fastening flanges 15 to bolt to the floor as at 16, and the pieces being placed in opposed relation and welded or otherwise suitably secured together. The pieces 14a and 14b have registering slots formed therein at the front and rear ends thereof, as indicated at 17 and 18, and some of the metal from these slots is utilized to provide outwardly bent flanges forming flat wide track surfaces 19 and 20 along the bottoms of the slots 17 and 18, respectively. Each slide carries two rollers 21 and 22 in transverse relation to the associated floor bracket between its side walls 13 arranged to run on the tracks 19 and 20, respectively. Each of these rollers is in the form of a short tubular body through which a pin 23 inserted through registering holes in the side walls 13 can be entered, sufficient clearance being left around the shank of the pin inside the roller for needles 24 forming a needle bearing. A cotter pin 25 inserted through the projecting end of the pin 23 holds it in place. It is obvious that the rollers with their needles in place can be inserted in the slots 17 and 18 before the slide is brought into position over the floor bracket 10 whereupon the pins 23 can be entered and fastened in place quickly. Assembling is, therefore, quite simple and inexpensive. The slide 10 supported in this manner on the bracket 14 will obviously work smoothly and easily and it is evident that at the time of assembling the rollers can be filled with lubricant sufficient to last indefinitely and insure easier operation. The tracks 19 and 20 it will now be noticed are both inclined rearwardly but the tracks 20 have a more pronounced inclination. As a result, when the seat is moved forward, the back of the seat is given pronounced elevation. This, as previously stated, makes for substantially the same comfort in any position of adjustment of the seat.

Each floor bracket 14 has the upper edges of the two halves thereof bent outwardly to provide longitudinal flanges 26 which serve to reenforce the bracket for increased strength and stiffness. The flange 26 on the part 14b of one of the floor brackets 14 is notched, as indicated at 27, to receive the tooth 28 on the end of a latch 29 pivoted as at 30 on a bracket 31 secured to the side of the slide 10. The tooth 28 projects through a slot 32 provided therefor in the side wall 13 of the slide, as shown in Fig. 2, and a spring 33 acting between the bracket 31 and the latch 29 normally tends to hold the latch in the position shown with the tooth 28 engaged in one of the notches 27. The latch can, however, be raised at its outer end by means of the rod 34 which has its bent lower end entered in a slot in the latch and is operable at its upper end by a knob 35 at one side of the seat 9. In that way the tooth 28 can be moved out of engagement with the notched flange to permit the seat to be moved forwardly or rearwardly to the extent permitted by the length of the slots 17 and 18, or just enough to get the seat in a more comfortable position, whereupon the latch 29 can be allowed to engage in the nearest notch 27 to lock the seat again. It is, therefore, clear that I have provided a notched member for cooperation with the seat latch as an integral part of the floor bracket and a saving in cost is thereby realized and the construction simplified.

The floor brackets 14 have registering holes 37' therein near the front ends thereof to receive a cross-shaft 37 entered through longitudinal slots 38 provided in the inner side walls 13 of the slides 10. Pinions 39 suitably secured to the shaft 37 near the ends thereof and immediately alongside the slides 10 mesh with racks 40 riveted or otherwise suitably secured to the inner side walls of the slides 10. In that way, the two slides 10 at opposite sides of a seat are interconnected for equal parallel motion and there is no danger of the seat tending to bind even though the thrust is applied to either side of the middle of the seat in moving or adjusting the seat in either direction.

Fig. 5 shows a slight variation of the construction in which a single member 14' forms the floor bracket and has an outwardly bent flange 19' defining the bottom of the slot 17', and a separate strip 41 is provided riveted or otherwise secured to the member 14', as at 42, and having a flange 43 in alignment with the flange 19' to provide the same width of track surface as in the previous construction even though the floor bracket is of single ply construction.

Another variation in construction is shown in Fig. 6 in which the member 14" forming the floor bracket is similar to the member 14' just described insofar as it has a flange 19" defining the bottom of its slot 17", but in this case a lug 44 is bent inwardly from the side wall of the slide 10' to engage the side of the member 14" to hold the slide against lateral movement. This construction would obviously still afford a rather wide track surface for the rollers and still be available at a lower cost than the other constructions.

Referring now to Figs. 7 and 8, the slide 10a shown in this view has two grooved rollers 21a and 22a entered through the enlarged rear and front ends 45 and 46 of two slots 17a and 18a, respectively, provided in the floor bracket 14a. Pins 23a entered through the side walls of the slide and through the rollers hold the same in position and it should be clear from Fig. 7 that the rollers are so assembled on the slides that the front roller 21a cannot reach the enlarged end 45a of the slot 17a upon extreme rearward movement of the seat, nor can the rear roller 22a reach the enlarged front end of the slot 18a upon extreme forward movement of the seat. The annular groove 47 in each roller is just deep enough so that the middle diameter of the rollers is slightly less than the width of the slots in the floor bracket and the rollers will accordingly work smoothly and easily back and forth. The grooves are, of course, slightly wider than the thickness of the stock used in the floor bracket to provide enough working clearance for easy operation without excess play. With this construction, due to the inclination of the slots 17a and 18a, it is clear that the seat when moved or adjusted forwardly is given increased elevation at the back similarly as with the other seat. The longitudinal flange 26a along the top of the floor bracket has notches 27 therein similarly as in the other construction to permit locking the seat releasably in adjusted position. In this construction, however, the cross-shaft 37a it will be observed is supported in bearings 48 formed in the floor brackets 14a and the gears 39a fixed on the projecting ends of the shaft cooperate with rack teeth 40a formed directly on the lower edge of one side wall of the seat slides 10a, and a coiled torsion spring 49 fixed at one end to the shaft and anchored at the other end on a pin 50 on the floor bracket maintains the shaft 37a under spring tension tending normally to move the seat forwardly when released. In that way, the movement or adjustment of the seat is greatly facilitated. Two springs may be provided if desired, one at each end of the shaft. Cleats 51 bearing against the ends of the shaft 37a hold the parts in assembled relation. The bearings 48 are provided by piercing and swedging the floor brackets whereby to provide increased width of bearing surface. Rollers 21a and 22a may or may not be equipped with needle bearings, like rollers 21 and 22.

It is believed the foregoing description conveys a good understanding of my invention. The appended claims have been drawn with a view to covering all legitimate modifications and adaptations.

I claim:

1. A longitudinally movable seat comprising a fixed floor bracket, a seat supporting bracket movable relative thereto, said seat-supporting bracket being of inverted channel shaped cross-section providing a top web portion and the floor bracket extending upwardly between the side walls thereof, means extending upwardly from the top web portion of said seat-supporting bracket for securing the same to the bottom of a seat, transverse rollers rotatably mounted between said side walls and engaged in longitudinal slots provided in the other bracket therebetween, whereby the seat supporting bracket is supported for roller action longitudinally relative to the floor bracket while preventing tilting displacement of the seat bracket relative thereto, the floor bracket being of sheet metal construction with metal from the slotted portions thereof bent to form longitudinal flanges providing thereon track surfaces engaging said rollers, and means for releasably securing said seat bracket in longitudinally adjusted relation to the floor bracket.

2. A longitudinally movable seat comprising a fixed floor bracket, a seat bracket movable relative thereto, one of said brackets being of channel shaped cross-section and the other extending between the side walls thereof, transverse rollers rotatably mounted between said side walls and engaged in longitudinal slots provided in the other bracket therebetween, whereby the seat bracket is supported for roller action longitudinally relative to the floor bracket while preventing tilting displacement of the seat bracket relative thereto, the slotted bracket being of sheet metal construction with metal from the slotted portions thereof bent to form longitudinal flanges providing thereon track surfaces engaging said rollers, means spacing the channel bracket laterally relative to the opposite side of the slotted bracket, and means for releasably securing said seat bracket in longitudinally adjusted relation to the floor bracket.

3. A longitudinally movable seat comprising a fixed floor bracket, a seat bracket movable relative thereto, one of said brackets being of channel shaped cross-section and the other extending between the side walls thereof, transverse rollers rotatably mounted between said side walls and engaged in longitudinal slots provided in the other bracket therebetween, whereby the seat bracket is supported for roller action longitudinally relative to the floor bracket while preventing tilting displacement of the seat bracket relative thereto, the slotted bracket being of sheet metal construction with metal from the slotted portions thereof bent to form longitudinal flanges providing thereon track surfaces engaging said rollers, another longitudinally flanged member on the opposite side of the slotted bracket providing a companion track surface in the same plane with at least one of the aforesaid track surfaces while spacing the channel bracket laterally relative to that side of the slotted bracket, and means for releasably securing said seat bracket in longitudinally adjusted relation to the floor bracket.

4. A longitudinally movable seat comprising a fixed floor bracket, a seat bracket movable relative thereto, one of said brackets being of channel shaped cross-section and the other extending between the side walls thereof, transverse rollers rotatably mounted between said side walls and engaged in longitudinal slots provided in the other bracket therebetween, whereby the seat bracket is supported for roller action longitudinally relative to the floor bracket while preventing tilting displacement of the seat bracket relative thereto, the slotted bracket being of two ply sheet metal construction with metal from the slotted portions thereof bent in opposite directions on the two plies to form transversely aligned longitudinal flanges projecting from opposite sides of the bracket providing thereon track surfaces for engagement with the rollers while spacing the side walls of the channel member laterally relative to the opposite sides of the slotted bracket, and means for releasably securing said seat bracket in longitudinally adjusted relation to the floor bracket.

5. A longitudinally movable seat comprising a fixed floor bracket, a seat bracket movable relative thereto, one of said brackets being of channel shaped cross-section and the other extending between the side walls thereof, transverse rollers rotatably mounted between said side walls and engaged in longitudinal slots provided in the other bracket therebetween, whereby the seat bracket is supported for roller action longitudinally relative to the floor bracket while preventing tilting displacement of the seat bracket relative thereto, the slotted bracket being of two ply sheet metal construction with metal from the slotted portions thereof bent in opposite directions on the two plies to form transversely aligned longitudinal flanges projecting from opposite sides of the bracket providing thereon track surfaces for engagement with the rollers while spacing the side walls of the channel member laterally relative to the opposite sides of the slotted bracket, the correlated longitudinal edges of said plies being bent in opposite directions to provide reinforcing longitudinal flanges, one of said flanges having longitudinally spaced openings provided therein, and means for releasably securing said seat bracket in longitudinally adjusted relation to the floor bracket, comprising a latch on the channel bracket engageable selectively in any one of said openings.

6. A longitudinally movable seat comprising a fixed floor bracket, a seat supporting bracket movable relative thereto, said seat-supporting bracket being of inverted channel shaped cross-section providing a top web portion and the floor bracket extending upwardly between the side walls thereof, means extending upwardly from the top web portion of said seat-supporting bracket for securing the same to the bottom of a seat, said floor bracket having longitudinal slots provided therein and being of sheet metal construction with metal from the slotted portions thereof bent outwardly to provide longitudinal flanges on which track surfaces are provided along the bottoms of said slots, transverse rollers rotatably mounted between said side walls and engaged in said longitudinal slots provided in said floor bracket and bearing upon said track surfaces, whereby the seat supporting bracket is supported for roller action longitudinally relative to the floor bracket while preventing tilting displacement of the seat bracket relative thereto, the floor bracket having a longitudinal reinforcing flange on the upper edge thereof projecting toward the side wall of the seat-supporting bracket, said reinforcing flange having longitudinally spaced openings provided therein, and means for releasably securing said seat supporting bracket in longitudinally adjusted relation to the floor bracket comprising a latch member on the seat-supporting bracket engageable selectively in either one of said openings.

7. A longitudinally movable seat comprising a fixed floor bracket, a seat bracket movable relative thereto, one of said brackets being of channel shaped cross-section and the other extending between the side walls thereof, transverse rollers rotatably mounted between said side walls and engaged in longitudinal slots provided in the other bracket therebetween, whereby the seat bracket is supported for roller action longitudinally relative to the floor bracket while preventing tilting displacement of the seat bracket relative thereto, the slotted bracket being of two ply sheet metal construction, the plies having the longitudinal edges bent outwardly in respectively opposite directions to provide transversely aligned wide attaching flanges on one edge and transversely aligned narrow reinforcing flanges on the other edge, the latter being between the side walls of the channel bracket, one of said reinforcing flanges having longitudinally spaced openings provided therein, and means for releasably securing said seat bracket in longitudinally adjusted relation to the floor bracket comprising a latch member on the channel bracket engageable selectively in either one of said openings.

8. A longitudinally movable seat comprising a fixed floor bracket, a seat-supporting bracket movable relative thereto, said seat-supporting bracket being of inverted channel-shaped cross-section providing a top web portion and the floor bracket being of sheet metal and extending upwardly between the side walls thereof and bent to provide laterally projecting longitudinal reenforcing flanges on the upper and lower edges thereof, the lower flange providing means for supporting and attaching the floor bracket to a floor, means extending upwardly from the top web portion of said seat-supporting bracket for securing the same to the bottom of a seat, a pair of transverse elongated rollers rotatably mounted between said side walls and peripherally engaged intermediate the ends thereof in longitudinal slots provided in the intermediate portion of the floor bracket therebetween, whereby the seat-supporting bracket is supported for roller action longitudinally relative to the floor bracket while preventing tilting displacement of the seat bracket relative thereto, the upper longitudinal flange on said floor bracket having longitudinally spaced openings provided therein, and means for releasably securing said seat bracket in longitudinally adjusted relation to the floor bracket comprising a latch member on the seat bracket engageable selectively in either one of said openings.

9. A longitudinally movable seat comprising a fixed floor bracket, a seat bracket movable relative thereto, one of said brackets being of channel shaped cross-section and the other extending between the side walls thereof, a transverse roller rotatably mounted between said side walls and engaged in a longitudinal slot provided in the other bracket therebetween, whereby the seat bracket is supported for roller action longitudinally relative to the floor bracket, the slotted bracket being of sheet metal construction with metal from the slotted portion thereof bent to form a longitudinal flange providing thereon a track surface engaging said roller, and means for releasably securing said seat bracket in longitudinally adjusted relation to the floor bracket.

10. A longitudinally movable seat comprising a fixed floor bracket, a seat-supporting bracket movable relative thereto, said seat-supporting bracket being of inverted channel shaped cross-section providing a top web portion and the floor bracket extending upwardly between the side walls thereof, means extending upwardly from the top web portion of said seat-supporting bracket for securing the same to the bottom of a seat, said floor bracket having a longitudinal slot provided therein and being of sheet metal construction with metal from the slotted portion thereof bent outwardly to provide a longitudinal flange on which a track surface is provided along the bottom of said slot, a transverse roller rotatably mounted between said side walls and engaged in said longitudinal slot to run on said flange as a track, whereby the seat-supporting bracket is supported for roller action longitudinally relative to the floor bracket, the upper edge of the floor bracket having longitudinally spaced openings provided therein, and means for releasably securing said seat-supporting bracket in longitudinally adjusted relation to the floor bracket comprising a latch member on the seat-supporting bracket engageable selectively in either one of said openings.

11. A longitudinally movable seat comprising a fixed floor bracket, a seat bracket movable relative thereto, one of said brackets being of channel shaped cross-section and the other extending between the side walls thereof, a transverse roller rotatably mounted between said side walls and engaged in a longitudinal slot provided in the other bracket therebetween, whereby the seat bracket is supported for roller action longitudinally relative to the floor bracket, the slotted bracket being of two ply sheet metal construction, the plies having the longitudinal edges bent outwardly in respectively opposite directions to provide transversely aligned wide attaching flanges on one edge, the other edge having longitudinally spaced openings provided therein, and means for releasably securing said seat bracket in longitudinally adjusted relation to the floor bracket comprising a latch member on the channel bracket engageable selectively in either one of said openings.

12. A longitudinally movable seat comprising a fixed floor bracket, a seat-supporting bracket movable relative thereto, said seat-supporting bracket being of inverted channel shaped cross-section providing a top web portion and the floor bracket extending upwardly between the side walls thereof, means extending upwardly from the top web portion of said seat-supporting bracket for securing the same to the bottom of a seat, said floor bracket having a longitudinal slot provided therein and being of sheet metal construction with metal from the slotted portion thereof bent outwardly to provide a longitudinal flange on which a track surface is provided along the bottom of said slot, a transverse roller rotatably mounted between said side walls and engaged in said longitudinal slot to run on said flange as a track, whereby the seat-supporting bracket is supported for roller action longitudinally relative to the floor bracket, said floor bracket having the upper and lower edges thereof formed to provide longitudinal flanges, the lower flange providing means for supporting and attaching the floor bracket to a floor, one of the three flanges on said floor bracket having longitudinally spaced openings provided therein, and means for releasably securing the seat-supporting bracket in longitudinally adjusted relation to the floor bracket comprising a latch member on the seat-supporting bracket engageable selectively in either one of said openings.

13. A longitudinally movable seat comprising a fixed floor bracket, a seat-supporting bracket movable relative thereto, said seat-supporting bracket being of inverted channel-shaped cross-section providing a top web portion, and the floor bracket being of sheet metal and extending upwardly between the side walls thereof and bent to provide a laterally projecting longitudinal reenforcing flange on the lower edge thereof providing means for supporting and attaching the floor bracket to a floor, means extending upwardly from the top web portion of said seat-supporting bracket for securing the same to the bottom of a seat, a pair of transverse elongated rollers rotatably mounted between said side walls and peripherally engaged intermediate the ends thereof in longitudinal slots provided in the intermediate portion of the floor bracket therebetween, whereby the seat-supporting bracket is supported for roller action longitudinally relative to the floor bracket while preventing tilting displacement of the seat bracket relative thereto, said floor bracket having longitudinally spaced openings provided in the upper edge thereof, and means for releasably securing the seat bracket in longitudinally spaced relation to the floor bracket comprising a latch member on the seat bracket engageable selectively in either one of said openings.

14. A longitudinally movable seat comprising a fixed floor bracket, a seat-supporting bracket movable relative thereto, said seat-supporting bracket being of inverted channel shaped cross-section providing a top web portion and the floor bracket extending upwardly between the side walls thereof, means extending upwardly from the top web portion of said seat-supporting bracket for securing the same to the bottom of a seat, crosspins carried on said side walls, elongated tubular rollers of small diameter in relation to their length rotatably mounted on said crosspins between said side walls and received in longitudinal slots provided in the other bracket therebetween, the slots being narrow in relation to their length, said rollers being inserted freely endwise through the slots and being movable axially except as otherwise limited, the rollers supporting the seat supporting bracket for roller action longitudinally relative to the floor bracket, while preventing tilting displacement of the seat bracket relative thereto, one of said brackets having laterally projecting flange means for slidable engagement with the other bracket to limit axial movement of the rollers in the slots while permitting rolling action in the slots, and means for releasably securing the seat bracket in longitudinally adjusted relation to the floor bracket.

15. A seat structure as set forth in claim 14, wherein the laterally projecting flange means is provided on the slotted bracket extending lengthwise relative to the slots so as to provide broad track surfaces for engagement by said rollers.

16. A longitudinally movable seat comprising a fixed floor bracket, a seat-supporting bracket movable relative thereto, said seat-supporting bracket being of inverted channel shaped cross-section providing a top web portion and the floor bracket extending upwardly between the side walls thereof, means extending upwardly from the top web portion of said seat-supporting bracket for securing the same to the bottom of a seat, transverse rollers rotatably mounted between said side walls and engaged in longitudinal slots provided in the other bracket therebetween, whereby the seat-supporting bracket is supported for roller action longitudinally relative to the floor bracket while preventing tilting displacement of the seat bracket relative thereto, means providing laterally projecting flanges on the floor bracket extending lengthwise of one side of the slots to provide broad track surfaces for engagement thereon of said rollers, and means for releasably securing said seat bracket in longitudinally adjusted relation to the floor bracket.

17. A longitudinally movable seat comprising a fixed floor bracket, a seat bracket movable relative thereto, one of said brackets being of channel shaped cross-section and the other extending between the side walls thereof, transverse rollers rotatably mounted between said side walls and engaged in longitudinal slots provided in the other bracket therebetween, whereby the seat bracket is supported for roller action longitudinally relative to the floor bracket while preventing tilting displacement of the seat bracket relative thereto, means on the slotted bracket providing laterally projecting flanges extending lengthwise of one side of the slots to provide broad track surfaces for engagement by said rollers, and means for releasably securing said seat bracket in longitudinally adjusted relation to the floor bracket.

18. A longitudinally movable seat comprising a fixed floor bracket, a seat bracket movable relative thereto, one of said brackets being of channel shaped cross-section and the other extending between the side walls thereof, transverse rollers rotatably mounted between said side walls and engaged in longitudinal slots provided in the other bracket therebetween, whereby the seat bracket is supported for roller action longitudinally relative to the floor bracket while preventing tilting displacement of the seat bracket relative thereto, means on the slotted bracket providing laterally projecting flanges on both sides thereof extending lengthwise of the bottom of the slot to provide broad track surfaces for engagement thereon of said rollers, and means for releasably securing said seat bracket in longitudinally adjusted relation to the floor bracket.

19. A longitudinally movable seat comprising a fixed floor bracket, a seat bracket movable relative thereto, one of said brackets being of channel shaped cross-section and the other extending between the side walls thereof, a transverse roller rotatably mounted between said side walls and engaged in a longitudinal slot provided in the other bracket therebetween, whereby the seat bracket is supported for roller action longitudinally relative to the floor bracket, means on the slotted bracket providing a laterally projecting flange extending lengthwise of the bottom of the slot to provide a track surface thereon for said roller, and means for releasably securing said seat bracket in longitudinally adjusted relation to the floor bracket.

20. A longitudinally movable seat comprising a fixed floor bracket, a seat-supporting bracket movable relative thereto, said seat-supporting bracket being of inverted channel shaped cross-section providing a top web portion and the floor bracket extending upwardly between the side walls thereof, means extending upwardly from the top web portion of said seat-supporting bracket for securing the same to the bottom of a seat, said floor bracket having a longitudinal slot provided therein, means on said floor bracket providing a laterally projecting flange extending lengthwise of the bottom of the slot to provide a track surface, a transverse roller rotatably mounted between said side walls and engaged in said longitudinal slot to run on said flange as a track, whereby the seat-supporting bracket is supported for roller action longitudinally relative to the floor bracket, the upper edge of the floor bracket having longitudinally spaced openings provided therein, and means for releasably securing said seat-supporting bracket in longitudinally adjusted relation to the floor bracket comprising a latch member on the seat-supporting bracket engageable selectively in either one of said openings.

WALTER R. LUSTIG.